March 24, 1936.                    C. L. HALL                     2,035,429
                     FASTENER AND FASTENER SECURED INSTALLATION
                               Filed June 1, 1934
Fig. 1.
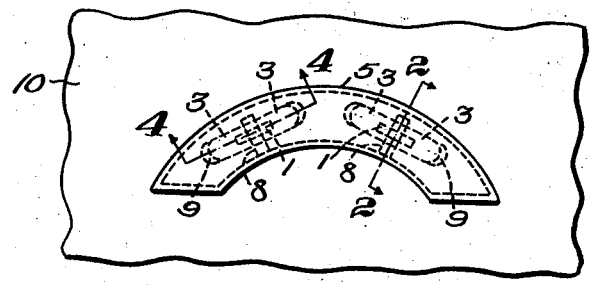
Fig. 2.                                   Fig. 3.
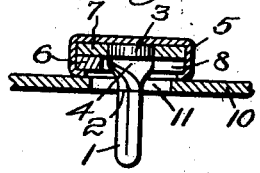                      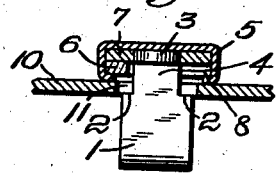
Fig. 4.
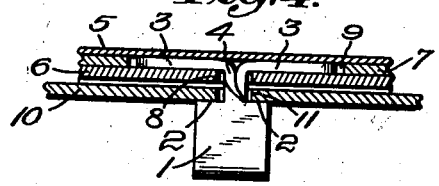
Fig. 5.          Fig. 6.          Fig. 7.
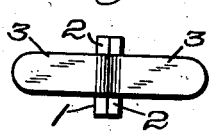  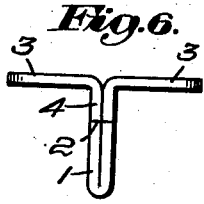  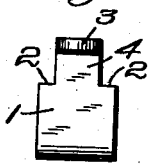
Inventor:
Charles L. Hall.
by Walter S. Jones
Atty.

Patented Mar. 24, 1936

2,035,429

UNITED STATES PATENT OFFICE 2,035,429

FASTENER AND FASTENER SECURED INSTALLATION

Charles L. Hall, Detroit, Mich., assignor to United-Carr Fastener Corporation, Cambridge, Mass., a corporation of Massachusetts Application June 1, 1934, Serial No. 728,533

3 Claims. (Cl. 40—20)

My invention aims to provide improvements in fastener secured installations and fasteners for the same.

In the drawing which illustrates a preferred embodiment of my invention:—

Figure 1 is an elevation view of a complete assembly including the elements of my invention;

Fig. 2 is an enlarged section taken on the line 2—2 of Fig. 1 showing the fastener in locked position;

Fig. 3 is a section of the parts as shown in Fig. 2 but showing the fastener in unlocked position;

Fig. 4 is an enlarged section taken on the line 4—4 of Fig. 1,

Fig. 5 is a plan view of the fastener per se;

Fig. 6 is a side elevation of the fastener per se; and

Fig. 7 is an end view of the fastener shown in Figs. 5 and 6.

My invention as illustrated by the annexed drawing relates particularly, though not exclusively, to a fastener secured installation whereby name plate devices and the like are easily and quickly attached to a relatively thin supporting structure by means of a novel fastener.

Referring first to the fastener per se, as illustrated in Figs. 5, 6, and 7, I have shown a simple device formed from a single piece of sheet metal. The sheet metal strip is preferably folded at the mid portion and portions brought into side-by-side contacting relationship to provide a folded attaching portion 1 having edge shoulders 2 the purposes of which will be more fully hereinafter described. The end portions of the strip are bent so as to extend away from each other to provide arms 3—3 at right angles to the folded portion 1, as clearly illustrated in Fig. 6. The arms 3—3 are preferably spaced from the shoulders 2 and the material between the arms and the shoulders is relatively narrow to provide a neck 4 which may be readily twisted so that that portion of the folded portion 1 between the shoulders 2 and the connected end may be turned to underlie the arms 3—3, as shown in Figs. 2 and 4.

The particular parts selected for illustration of the use of my improved fastener include a name plate structure which is adapted to be secured to a thin sheet metal part. It should be understood, however, that other parts may be secured together by my improved fastener. The name plate structure includes a sheet metal hollow casing part 5, a fastener-holding piece 6 and a filler member 7, all of which are clearly illustrated in Figs. 2 and 4. The fastener-holding piece 6 is provided with an aperture 8 and the filler member 7 is provided with an aperture 9 so that the fastener may be assembled with the casing and held in position by the parts 6 and 7, as shown in Figs. 3 and 4. Assembly of the parts of the plate unit is a relatively simple matter and may be effected by first placing the filler piece into the hollow casing 5 and then placing the fastener member in position with the arms 3—3 entered into the aperture 9 in the filler member 7. This aperture 9 is about the same shape as the shape provided by both of the arms 3—3. The aperture may be a little longer (Fig. 1) to permit slight adjustment of the fastener. Thereafter the fastener-holding piece 6 is inserted into the casing 5 and finally the edges of the casing 5 are crimped over the fastener-holding piece 6 thereby securing all of the parts together, as shown in Fig. 3. It will be noted (Fig. 4) that the aperture 8 in the fastener-holding piece 6 is of such dimensions as to permit passage of the folded portion 1 of the fastener while being smaller than the aperture 9 in the filler member 7 so that the arms may engage the fastener-holding piece 6. Thus the fastener is held in a predetermined position by a combination of the parts 6 and 7.

The name plate assembly illustrated is secured to a thin sheet metal part 10, such for instance as the instrument panel of a motor vehicle by entering the folded portion 1 of the fastener through a slot 11 (Fig. 4) which is about the size and shape of the folded portion 1, as best illustrated in Figs. 3 and 4. Thereafter that portion of the folded portion 1 which lies between the shoulders 2 and the connected end of the folded portion 1 is twisted 90° so that it is crosswise of the slot 11 and brings the shoulders 2 into contact with the material of the part 10, as clearly illustrated in Fig. 4. Thus it is a simple matter to assemble the parts of my improved installation, because it is merely necessary to twist the neck portion 4 of the fastener to turn the shoulders 2 into locking position. If at any time it is necessary to remove the name plate or other device, the folded portion may be turned into alignment with the slot 11 by reversing the twisting operation. Furthermore, two or more fasteners may be assembled with any part which is to be secured to a supporting structure.

While I have illustrated and described a preferred embodiment of my invention, I do not wish to be limited thereby, because the scope of my invention is best defined by the following claims:

I claim:

1. An installation of the class described comprising, in combination, a plurality of parts to be secured together, and a fastener member securing said parts together, one of said parts having an elongated aperture in the form of a slot, another part having a slot in alignment with the slot in said first mentioned part, and said fastener member having a folded portion passing through both slots, a pair of oppositely extending arms engaging the second mentioned part and said folded portion having shoulders thereon and being twisted to engage said shoulders with the first mentioned part whereby said shoulders and said arms cooperate to hold the parts together.

2. An installation of the class described comprising, in combination, a name plate and like assembly having a casing part, a fastener-holding piece assembled with said casing part and having a slot therethrough, a fastener member having oppositely extending arms assembled between said fastener-holding piece and said casing part, a folded portion connecting said arms and extending through said slot, a supporting member to which said name plate assembly is attached, said supporting member having a slot therethrough and said folded portion of the fastener having shoulders spaced from said arms, said folded portion passing through the slot in said supporting member and being twisted between the shoulders and arms whereby said shoulders are engaged with said supporting member to hold the name plate securely in position.

3. A name plate and like assembly including a casing part, a fastener-holding piece assembled with said casing part, a fastener member having a pair of oppositely extending arms located between the casing part and the fastener-holding piece, a filler member located between the fastener-holding piece and the casing part and cut out to receive and closely fit said arms, a folded portion extending from said arms through an aperture in the fastener-holding piece and presenting shoulders spaced from the bottom of said fastener-holding piece for the purposes described.

CHARLES L. HALL.